United States Patent [19]

Nagahara et al.

[11] Patent Number: 5,003,411

[45] Date of Patent: Mar. 26, 1991

[54] METHOD FOR RECORDING/REPRODUCING AND SEARCHING DIGITAL SIGNALS USING A HELICAL SCAN TYPE ROTARY HEAD

[75] Inventors: Shinichi Nagahara; Tomoyuki Suzuki; Tomoyasu Yamada; Tokihiro Takahashi; Ichiro Miyake, all of Saitama, Japan

[73] Assignee: Pioneer Electronic Corporation, Tokyo, Japan

[21] Appl. No.: 473,027

[22] Filed: Jan. 31, 1990

Related U.S. Application Data

[62] Division of Ser. No. 270,336, Nov. 14, 1988.

[30] Foreign Application Priority Data

Feb. 26, 1988 [JP] Japan ................................. 63-42274
Mar. 4, 1988 [JP] Japan ................................. 63-51305
Mar. 4, 1988 [JP] Japan ................................. 63-51306

[51] Int. Cl.$^5$ ............................................ G11B 15/46
[52] U.S. Cl. ................................................. 360/72.2
[58] Field of Search ...................................... 360/72.2

[56] References Cited

U.S. PATENT DOCUMENTS 4,641,208  2/1987  Inazawa et al. ...................... 360/72.2
4,786,985  11/1988  Williams ............................. 360/72.2
4,816,940  3/1989  Nagasawa et al. .................. 360/72.2

Primary Examiner—Robert S. Tupper
Attorney, Agent, or Firm—Sughrue, Mion, Zinn, Macpeak & Seas

[57] ABSTRACT

A method for performing a reproduction and search operation on a data recording and reproducing device of the helical scan type which includes a pair of recording and reproducing heads mounted on a rotary drum. The method includes the steps of: (a) during the reproduction operation, transporting the tape and rotating the rotary drum such that a relative speed between said tape and the heads is either a first relative speed or a second relative speed which is less than the first relative speed; and (b) during the search operation, transporting the tape at a speed substantially greater than a tape speed used during the reproduction operation and rotating the rotary drum at a speed such that a relative speed between the tape and the heads is equal to the second lower relative speed.

6 Claims, 12 Drawing Sheets

METHOD FOR RECORDING/REPRODUCING AND SEARCHING DIGITAL SIGNALS USING A HELICAL SCAN TYPE ROTARY HEAD

This is a divisional of application Ser. No. 07/270,336, filed Nov. 14, 1988.

BACKGROUND OF THE INVENTION

The present invention relates to an apparatus for storing and reproducing digital signals of the helical scan type employing a rotary head. More particularly, the invention relates to an apparatus for storing and reproducing digital signals employing a rotary head of small diameter and compact size, but in which the same tape format as used previously is retained.

Figure 1:
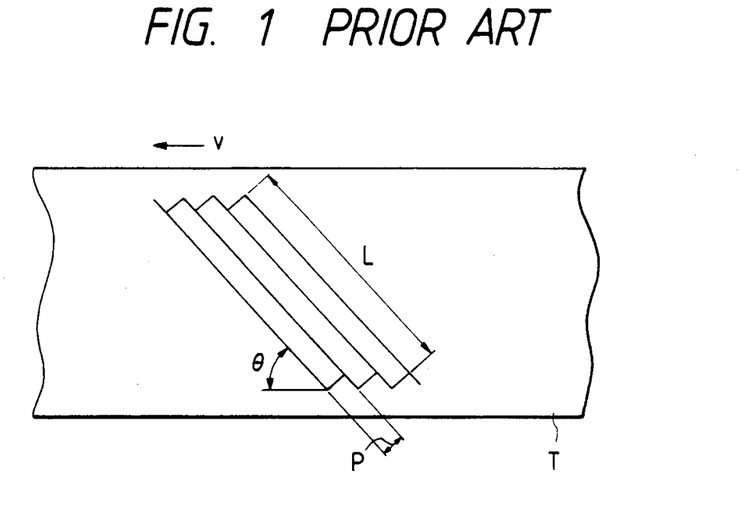
FIG. 1 is a diagram illustrating a tape format.

One such apparatus is a rotary head type digital audio tape recorder (R-DAT) recently placed on the market. An R-DAT includes two heads, mounted on a rotary drum and having different azimuths. With an R-DAT as shown in FIG. 1, a track length L, a track angle Θ, and a track pitch P determine the tape format 15 on a magnetic tape T that is running at a predetermined speed v. The rotational speed R per unit time of the rotary drum, the drum diameter D, and tape wrap-around angle α may be set at will as long as the requirements for the track length, track angle and track pitch are met.

Early R-DATs commonly employed certain recommended values for the above requirements, i.e., a rotational speed R of 2000 rpm, a drum diameter D of 30 mm, and a tape wrap-around angle α of 90°. Recently, it has been proposed that a drum diameter D of 15 mm be employed to obtain a more compact apparatus, together with a wrap-around angle of 180° and a rotational speed of 2000 rpm.

Figure 2:
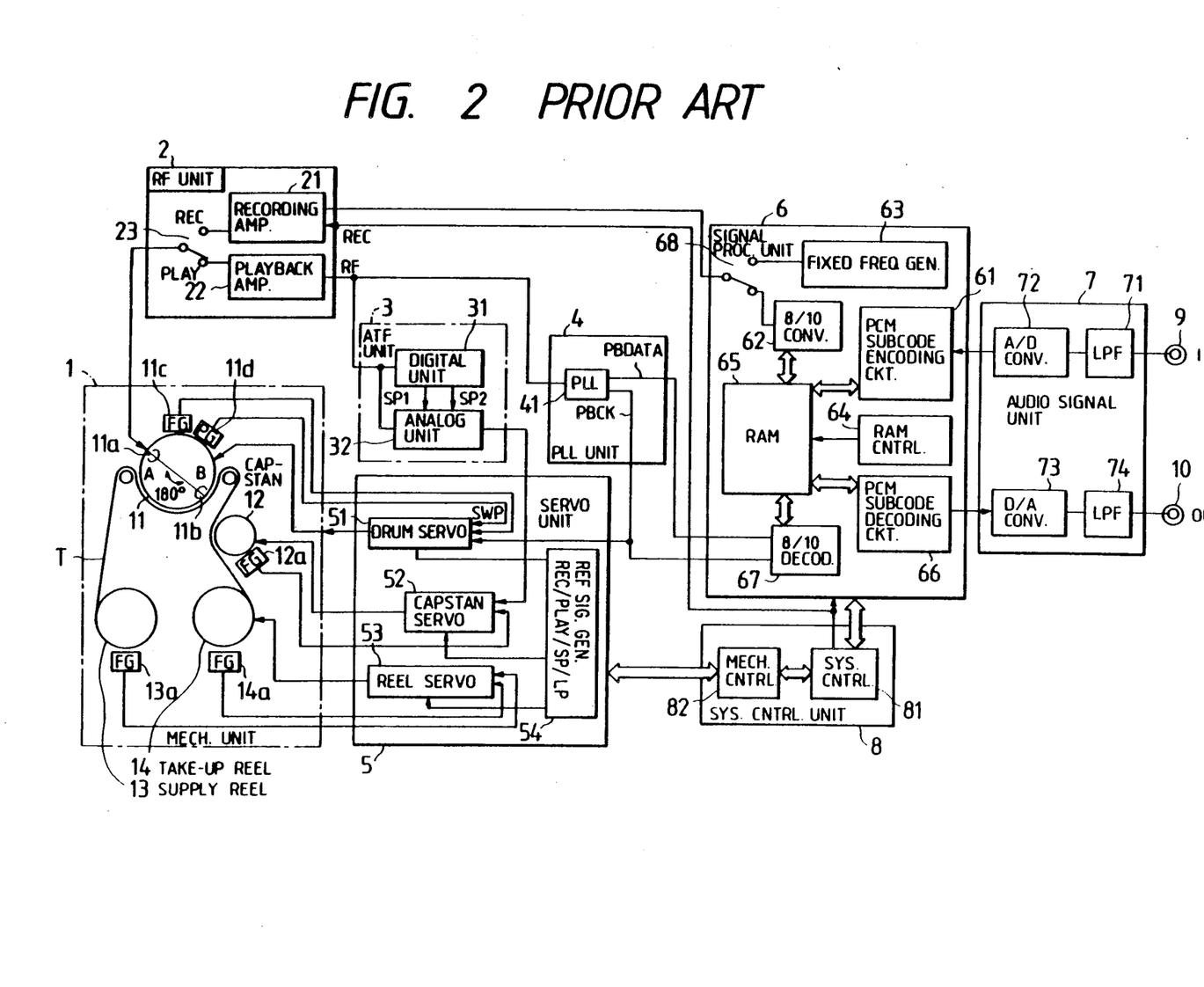
FIG. 2 is a diagram illustrating a general circuit arrangement of an R-DAT to which the present invention is applied.

FIG. 2 shows the general circuit arrangement of an apparatus as proposed above. The apparatus include a mechanical unit 1, a high frequency (RF) unit 2, an ATF (Automatic Track Finding) processing unit 3, a PLL (Phase-Locked Loop) 4, a servo unit 5, a signal processing unit 6, an audio signal unit 7, and a system control unit 8.

In the aforementioned apparatus, when storing data, an analog signal applied to an analog signal input terminal 9 is filtered to remove unwanted high frequency components thereof by a low pass filter (LPF) 71 in the audio signal unit 7. The output of the LPF 71 is supplied to an A/D converter 72 to be converted into a digital signal. The digital signal from the audio signal unit 7 is input to a PCM subcode encoding circuit 61 in the signal processing unit 6. The PCM subcode encoding circuit 61 effects interleaving of these data stored in the RAM 65 and produces and adds correction codes and subcodes. Thereafter, these data are again stored in the RAM 65 under control of a RAM control unit 64. The output of the RAM 65 is converted by 8/10 converter 62 then input to a recording amplifier 21 in the RF unit 2. In the RF unit 2, a switch 23 is set to a "REC" position when an REC control signal from the system control unit 8 is at the "H" level, and thus the data from the recording amplifier 21 is supplied through the switch 23 to heads 11a and 11b so that the data is recorded on the magnetic tape T. The heads 11a and 11b are provided on a drum 11 to perform data recording on and reproduction from the tape T.

For reproduction, the signals that are read through the heads 11a and 11b are input to a reproduction amplifier 22 in the RF unit 2 through the switch 23. The output of the amplifier 22 is input to a PLL circuit 41 in the PLL unit 4 where period detection is effected to separate the data into playback data PBDATA) and a playback clock (PBCK). The PBDATA and the PBCK signals are input to an 8/10 demodulator 67 in the signal processing unit for demodulation, and the resulting output is applied to the RAM 65 to be stored in order under the control of the RAM control unit 64.

Connected to the RAM 65 is a PCM subcode decoding circuit 66 which performs error correction and deinterleaving of the data stored in the RAM 65. The output of the circuit 66 is input to a D/A converter 73 in the audio signal unit 7 to be converted into an analog signal, which in turn is supplied to an LPF 74 for removal of the unwanted high frequency components thereof. Thereafter, the analog signal is output from an analog signal output terminal 10. Within the signal processing unit 6 is provided a fixed frequency generator 63 for generating various fixed frequency signals such as ATF. The fixed frequency signals provided by the generator 63 are recorded at a predetermined location on the magnetic tape by shifting the switch 68 at a predetermined timing.

A rotary drum 11 of the mechanical unit 1, a capstan 12, a supply reel 13, and a take-up reel 14 are controlled through servo control. For this purpose, a frequency generator (FG) 11c and a pulse generator (PG) 11d are provided for the rotary drum, a frequency generator FG12a for the capstan 12, and frequency generators FG13a and FG14a for reels 13 and 14, respectively. The outputs from the FG 11C and the PG 11d are input to a drum servo circuit 51 in the servo unit 5, while a reference signal from a reference signal generator 54 and the clock PBCK from the PLL unit 4 are input to the drum servo circuit 51, thereby applying phase servo control to the drum motor (not shown) so that reproduction and recording of data may be effected when the heads 11a and 11b are in contact with the tape T. The output from the FG 12a is input to a capstan servo circuit 52 of the servo unit 5 together with a reference signal from the reference signal generator 54 and an error signal indicative of an amount of off-track error from the ATF processing unit 3 to thereby servo-control a capstan motor (not shown) for driving the capstan 12. The outputs of the FG 13a and 14a are input to the reel servo unit 53 in the servo unit 5 together with the reference signal from the reference signal generator 54 to servo-control the reel motor (not shown) for driving the reels 13 and 14.

In the example shown, the drum diameter D is 15 mm and the tape wrap-around angle α is 180 degrees. The reference signal is input from the reference signal generator 54 to the drum servo circuit 51 so that the drum 11 rotates at 2000 rpm for both recording and reproduction modes when the apparatus is in the SP mode, and rotates at 1000 rpm for both recording and reproduction modes when the apparatus is in the LP mode. Also, the capstan servo circuit 52 is supplied with a reference signal which sets the tape speed v to 8.15 mm/sec in the SP mode and to 4.075 mm/sec in the LP mode.

For reproduction, the amount of off-track error is detected from the reproduced signal in both the SP mode and the LP mode for controlling the advancement of the tape on the basis of the amount of off-track error to thus accurately trace the track on which a signal has been recorded. The automatic control of the track trace when reproducing the signal stored is called ATF (Automatic Track Finding). For ATF, the reproduced signal is input to the digital unit 31 in the ATF processing unit 3 to detect a sync signal from the reproduced signal, thereby outputting sample pulses SP1 and SP2 for sampling the amounts of off-track error of adjacent tracks on both sides of a presently traced track. These pulses are input to an analog unit 32 of the ATF processing unit 3 to detect the difference between the amounts of off-track error of the two adjacent tracks, the difference signal being employed as a tracking control signal for reproducing operations.

A reel servo circuit 53 mainly functions in such a way that the square of the sum of the FG periods of the FG 13a of the supply reel 13 and the FG 14a of the take-up reel 14 in the mechanical unit 1 is maintained constant during search operations, thereby maintaining a constant speed of tape advancement. A system controller 81 in the system control unit 8 controls the writing and reading operations of subcode signals, while a mechanical controller 82 controls the mechanical unit 1.

The operation of the aforementioned arrangement will now be described in more detail with reference to the timing chart of FIG. 3.

Figure 3:
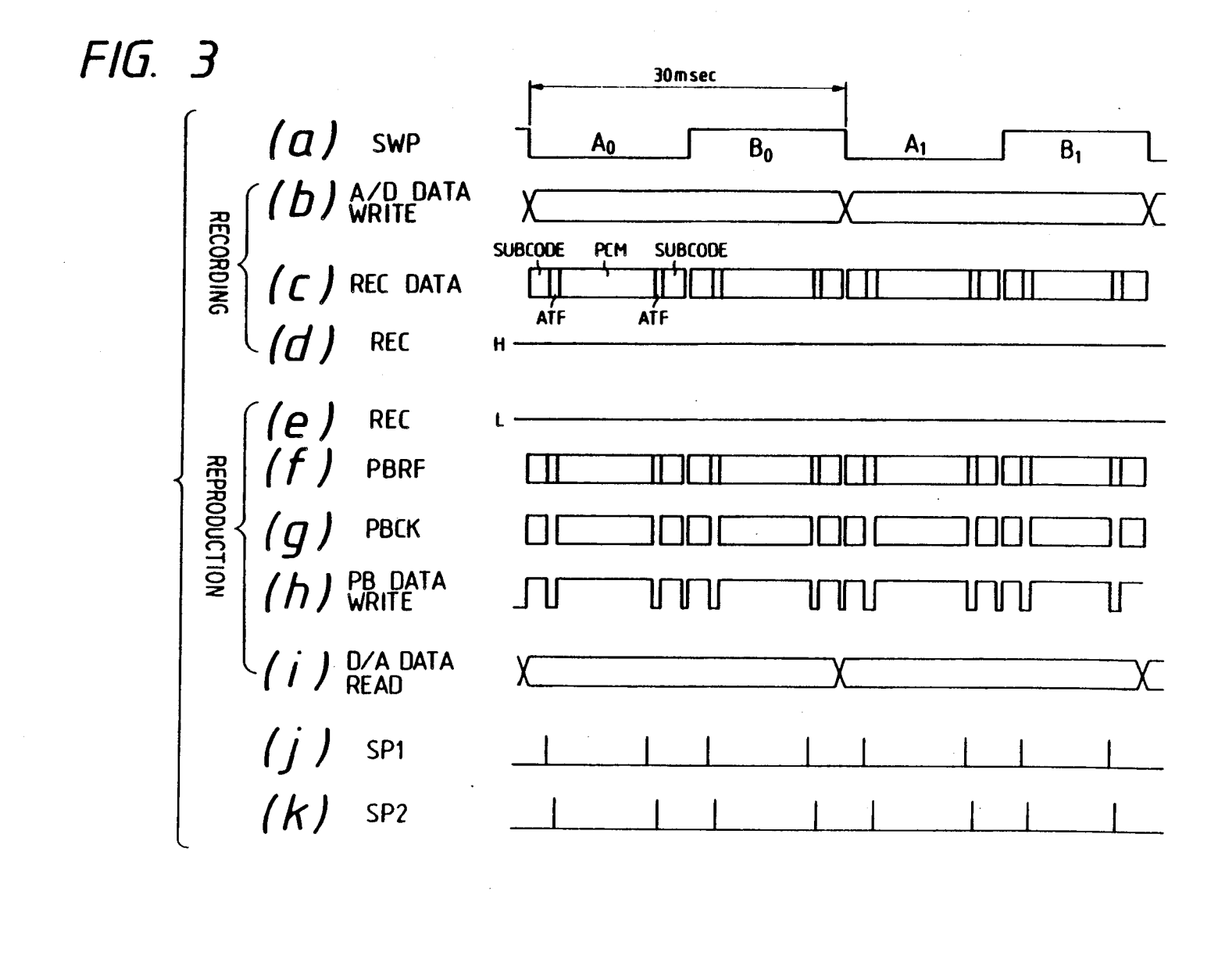

In the SP mode, the rotary drum 11 rotates at 2000 rpm for both writing and reading, and thus the pulse generator 11d outputs a switch signal SWP having a period of 30 msec, as shown in FIG. 3 at (a), in accordance with the outputs of the heads 11a and 11b.

In the write mode, an REC signal is at the "H" level, as shown in FIG. 3 at (d). PCM data is then recorded in two tracks, i.e., a track A and a track B, which together form a frame. Both tracks are assigned the same frame address. The PCM data is required to be processed and stored within 30 msec. The recording data (REC DATA) can be recorded at any time within this period, as shown in FIG. 3 at (c). The digital data from the A/D converter 72 is written into the RAM 65 during a time period of 30 msec between $A_0$ and $B_0$ of the switch signal SWP as shown in FIG. 3 at (b), is then interleaved (C1 and C2), and is read out of the RAM 65 during a time period between $A_1$ and $B_1$ equivalent to a unit rotation of the rotary drum.

Into the REC DATA, as shown in FIG. 3 at (c), is inserted signals of fixed frequencies required for the established DAT format, such as an ATF sync signal and pilot signal, at a predetermined timing by shifting the switch 68.

On the other hand, the REC signal is at "L", as shown in FIG. 3 at (e), and the reproduced high frequency signal (PBRF) is a continuous waveform, as shown in FIG. 3 at (f). A reproduced clock (PBCK) is sampled from this PBRF in the PLL unit 4, as shown in FIG. 3 at (g). Also, as shown in FIG. 3 at (h), only subcodes and PCM portions are written as reproduced data (PB DATA) into the RAM 65.

Reading of D/A DATA from the RAM 65 for D/A conversion by the S/A converter 73 is sequentially carried out with the same frame address every 30 msec, as shown in FIG. 3 at (i). At this time, tracking is effected by sampling the amount of off-track error of the two adjacent tracks on the basis of the sampling pulses SP1 and SP2 shown in FIG. 3 at (j) and (h), respectively, generated by the digital unit 31 in the ATF processing unit 3, which detects the ATF sync pattern for generating the sampling pulses.

Figure 4:
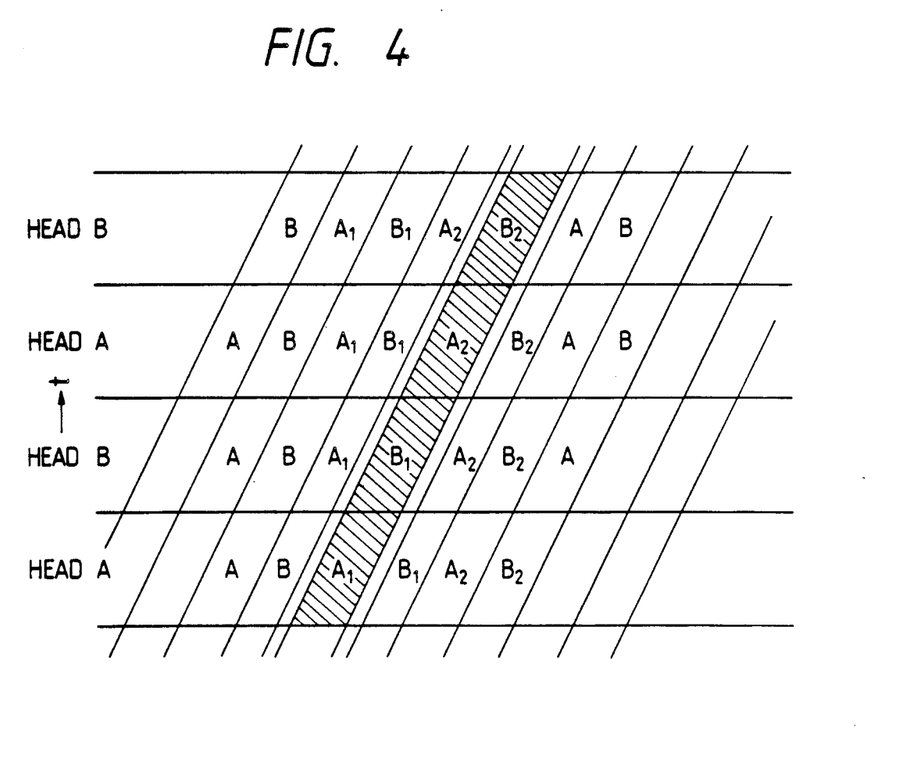
FIG. 4 is a diagram illustrating the head and the track in the example of FIG. 1, FIGS. 5A and B and 6A and B are waveform diagrams showing PBRF signal waveforms in the SP and the LP modes of rotary drums having different diameters.

As far as the apparatus operates under the above described conditions, i.e., a drum diameter of 15 mm, a wrap-around angle of 180 degrees, a rotational speed of 2000 rpm in the SP mode and 1000 rpm in the LP mode, the rotary drum 11 rotates with a certain period t, the tape T runs at a predetermined speed, and the heads A and B trace the tracks A and B, respectively, as shown in FIG. 4 (for reproduction), no problems occur.

However, with the above described prior art arrangement, not only the tape speed v but also the drum rotation in the LP mode must be half those in the SP mode. Thus, if the drum diameter D is 30 mm, the RF signals obtained in the SP and the LP modes will be as shown at (a) and (b), respectively, in FIG. 5, while, if the drum diameter is 15 mm to allow for a more compact size of the apparatus, the RF signals obtained in the SP and the LP modes will be as shown at (a) and (b), respectively, in FIG. 6.

Figure 5:
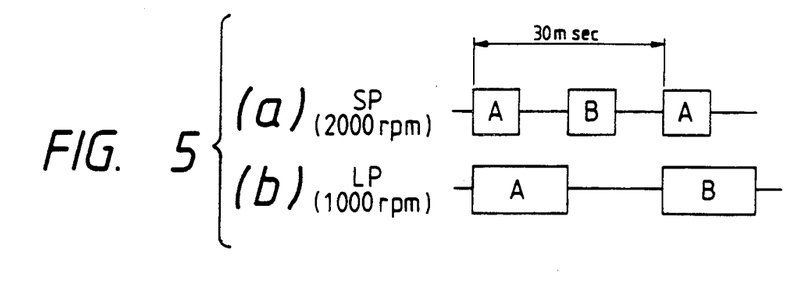
Figure 6:
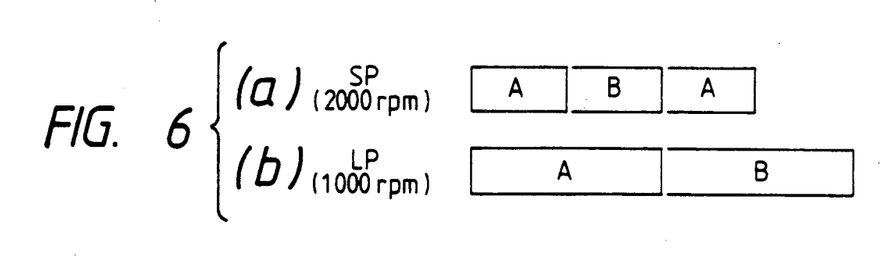

As is apparent from comparing the two figures, reducing the drum diameter D to 15 mm decreases the speed of the tape relative to the head in the LP mode to one-quarter of the recommended value in the SP mode, thereby causing problems such as a high error rate due to the decreased signal level.

Increasing the drum rotational speed to, for example, 4000 rpm in the SP mode and 2000 rpm in the LP mode to increase the relative speed between the tape and the head will overcome such problems but causes another problem in that the respective heads cannot accurately trace the corresponding tracks.

An R-DAT is capable of recording data at a high data density and long recording times are possible. These advantageous properties though are accompanied by difficulties in searching for a desired tune on a tape.

The R-DAT is provided with a high speed search function in which the tape is made to run at a speed about 200 times greater speed than that used in reproduction in the SP mode for reading an ID (S-ID), a program number (PNO), and a time code, i.e., information indicative of the start of a tune which has been recorded in subcode areas on both sides of the PCM area on the tape. In order to read this information during a high speed search, it is necessary to set the relative speed between the tape and the head equal to that during reproduction. Because a change in the relative speed causes a change in the frequency range of the read-out signal, the frequency responses of the head, the amplifier, and equalizer must be changed and the frequency range of the PLL unit and the signal processing unit must be widened.

Figure 15:
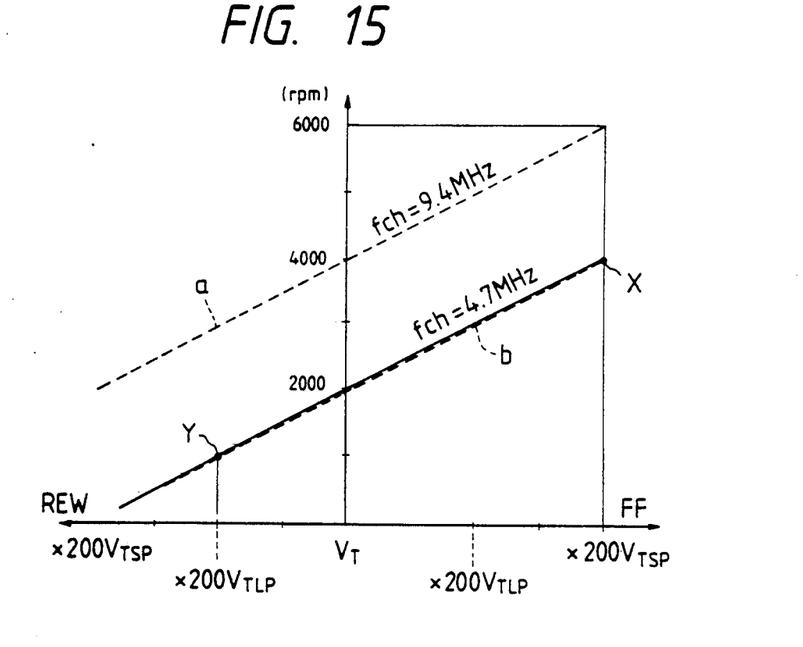
FIG. 15 is a graph showing the relation of search speed versus drum rotational speed in the SP mode and the LP mode.

The dotted lines a and b in FIG. 15 show the relationship between the search speed and the drum rotational speed. The dotted line a indicates the relative speed corresponding to a drum rotational speed of 4000 rpm. As is apparent from the graphs, when searching at a tape speed 200 times faster than that used for normal reproduction, the rotary drum 11 must rotate at about 6000 rpm, nearly 1.5 times faster than for reproducing.

The rotary drum 11 is driven by a drum motor, the rotational speed of which can be varied by varying the voltage applied thereto. Thus, varying the rotational speed over a wide range requires varying the voltage applied to the drum motor over a wide range. Consequently, provision of an adequate response in the servo channel requires a voltage source of high voltage, which is a serious problem with a portable R-DAT operating on a battery source.

SUMMARY OF THE INVENTION

Accordingly, an object of the present invention is to provide a digital signal storage and reproduction apparatus which employs the same tape format as that employed when a drum having two heads mounted thereon at the same height in opposition to each other rotates at a predetermined rotational speed, even when the drum is caused to rotate at a speed N times higher than the predetermined rotational speed.

According to the present invention, to solve the aforementioned problems there is provided an apparatus for recording and reproducing digital signals using a helical scan method employing a rotary drum having two heads, wherein the product of the diameter D of a drum having two heads mounted at the same height in opposition to each other and the wrap-around angle of the storage medium with respect to the rotary drum is maintained constant, and the drum is caused to rotate at a rotational speed N times higher than a predetermined rotational speed. Also, one of the two heads is mounted higher than the other by a distance of $(1-1/N)P$ to provide a step, and the other head is mounted at a position an angle behind the position at which the other head opposes the one of the heads, which angle is given by the following equation:

$$\frac{(1-1/N)P}{\tan \theta} \cdot \frac{C}{L \cdot D}$$

where L is the track length in the tape format in which the rotary drum rotates at the predetermined rotational speed, $\Theta$ is the track angle, P is the track pitch, and C is a constant dependent on the drum diameter D and the wrap-around angle.

Another object of the present invention is to provide an apparatus for reproducing digital signals in which the maximum rotational speed of the rotary drum in a high speed search mode can be set as low as possible.

In accordance with this object, the present invention provides an apparatus for reproducing digital signals according to the helical scan method which has functions for individually processing signals that are reproduced at different relative speeds, wherein the apparatus is provided with function-selecting means for performing a search operation at a lower relative speed when a high speed search operation is performed.

More specifically, when reproducing digital signals with the rotational speed of the drum being set to 4000 rpm in the SP mode and to 2000 rpm in the LP mode, the search operation is controlled on the basis of certain curves (shown in FIG. 15) in such a way that the relative speed between the head and the storage medium is made equal to that for reproduction at a drum speed of 2000 rpm, thereby allowing low rotational speeds of the rotary drum in the high speed searching mode as compared to conventional apparatuses, which in turn enables a reduced upper limit of the drum rotational speed.

BRIEF DESCRIPTION OF THE DRAWINGS

FIGS. 3A–R are a timing chart showing waveforms of various signals in the R-DAT of FIG. 2 for a prior art apparatus;

FIGS. 9A–R are a timing chart showing waveforms of various signals in the apparatus of FIG. 2 using the rotary drum of FIGS. 8A to 8C;

FIG. 12A–F are a timing chart showing waveforms of various parts of the apparatus of FIG. 2 of another embodiment of the invention;

FIGS. 17A–E, and 18 A–E, and 19A–C are timing diagrams illustrating the operation of another embodiment of the invention.

DESCRIPTION OF THE PREFERRED EMBODIMENTS

Figure 7:
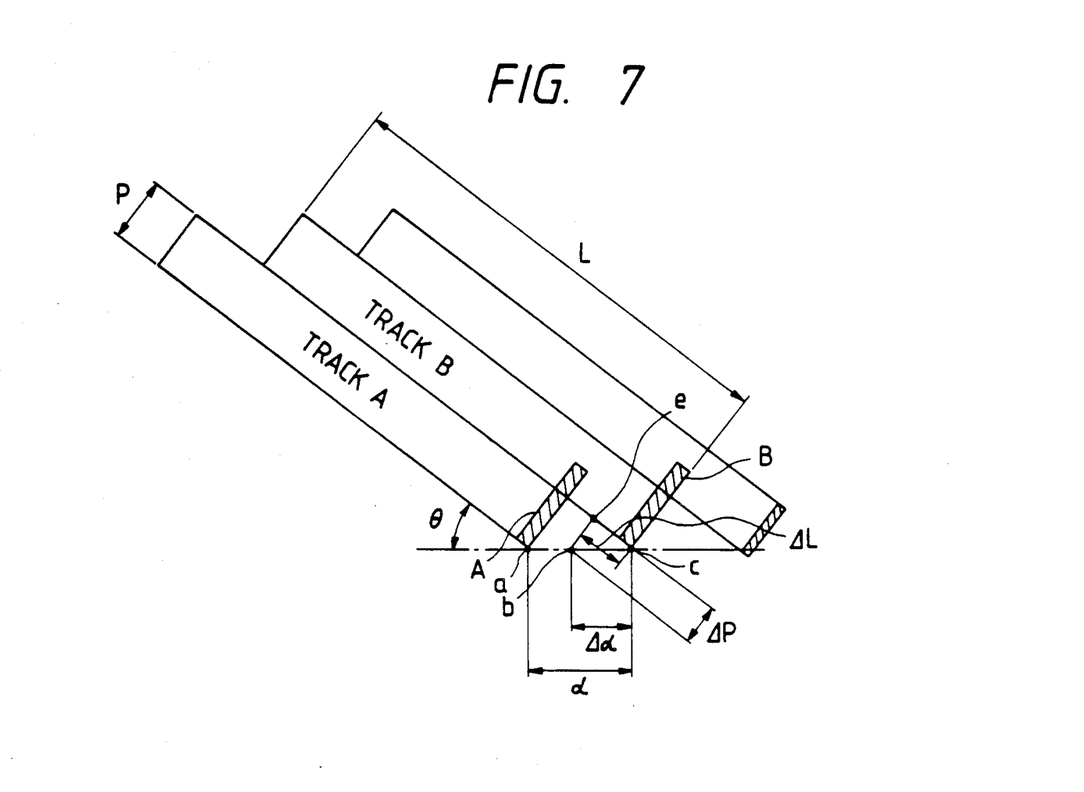
FIG. 7 is a diagram illustrating principles of the present invention.

With a conventional R-DAT operating according to the helical scan method employing a rotary drum having two heads mounted at the same height in opposition to each other, a tape format having a predetermined track length L, a track angle $\Theta$, and a track pitch P as shown in FIG. 7 is obtained when the product of the diameter D of the rotary drum and the wrap-around angle $\alpha$ of the magnetic tape around the rotary drum is maintained constant and the rotary drum rotates at the predetermined rotational speed.

For example, for recording data, when the head A initiates tracing from a point a on the track A, the head B following the head A initiates tracing from a point c on the track B. The distance d from the point a to the point b at this time is related to the track pitch P as follows:

$$P = d \cdot \sin \Theta$$

On the other hand, when the rotary drum rotates at a rotational speed N ($N \geq 1$) times higher than the predetermined rotational speed at which the format in FIG. 1 is obtained, the head B following the head A reaches the point b on the track B but not the point c on the track B; that is, the head B cannot trace the track B.

In order for the head B to trace the track B, the head B can be set a distance $\Delta P$ higher than the head A, as shown in FIG. 7. The larger the value of the aforementioned number N, the larger the value of $\Delta P$. Also, as N becomes closer to 1, $\Delta P$ approaches 0. Thus, $\Delta P$ is given by:

$$\Delta P = (1 - 1/N) \cdot P$$

Accordingly, a two times larger rotational speed of the rotary drum results in $\Delta P = P/2$; therefore, setting the head B higher by one-half track pitch permits the head B to accurately trace the track B.

However, setting the head B higher by a distance $\Delta P$ shifts the trace-starting point of the head B to a point e which is removed from the point c by a distance of $\Delta L$. The position of the head B can be shifted by an angle B corresponding to $\Delta L$ to bring the trace-starting point of the head B back to the point c. The value of $\Delta L$ in this case is given by:

$$\Delta L = P/\tan \Theta$$

The wrap-around angle $\alpha$ of the rotary drum is proportional to the track length L, where the following relation holds:

$$\beta/\alpha = \Delta L/L, \beta = \Delta L \cdot \alpha/L$$

Also, since $D \cdot \alpha = C (= 30 \times 90 = \text{constant})$ and thus $\alpha = C/D$, $$\beta = \frac{(1 - 1/N)P}{\tan \theta} \cdot \frac{C}{L \cdot D}$$

With the aforementioned arrangement, setting one of the heads higher than the other compensates for the off-track error in the direction of track pitch which the following head encounters if the rotational speed of the rotary drum is increased to N times higher than the predetermined rotational speed. Also, mounting one of the heads an angle behind the position at which one head opposes the other diametrically permits compensation for the off-track error in the lengthwise direction of the track, which angle is given by:

$$\frac{(1 - 1/N)P}{\tan \theta} \cdot \frac{C}{L \cdot D}$$

Thus, the required tape format can still be obtained even When the drum is made to rotate at a speed N times higher, thereby improving the error rate, etc.

The construction of a first preferred embodiment of the present invention will now be described with reference to the drawings.

Figure 8A:
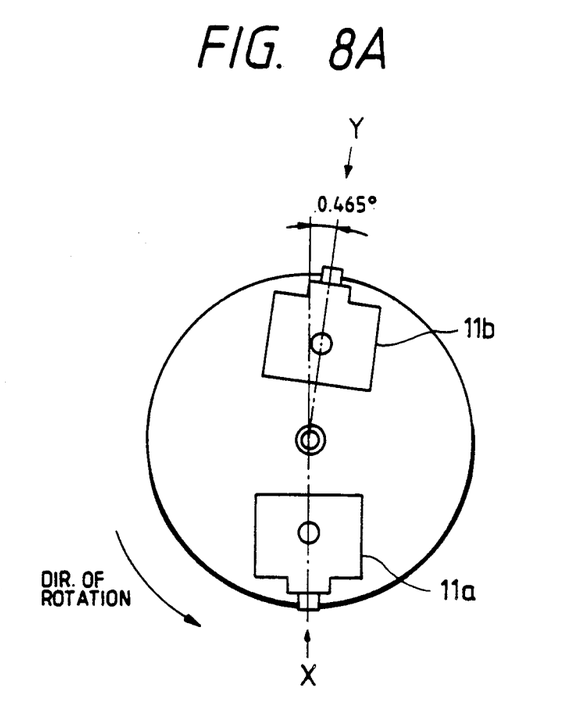
FIGS. 8A, 8B and 8C are diagrams showing the arrangement of a rotary drum according to the invention.
Figure 8B:
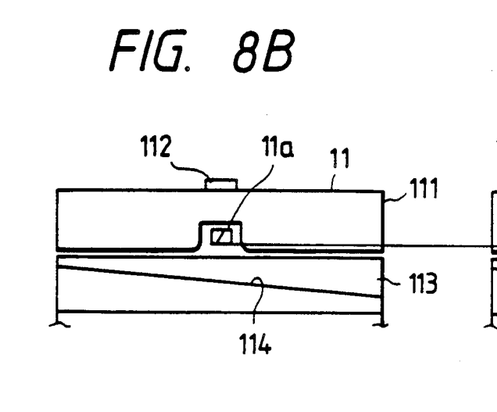
Figure 8C:
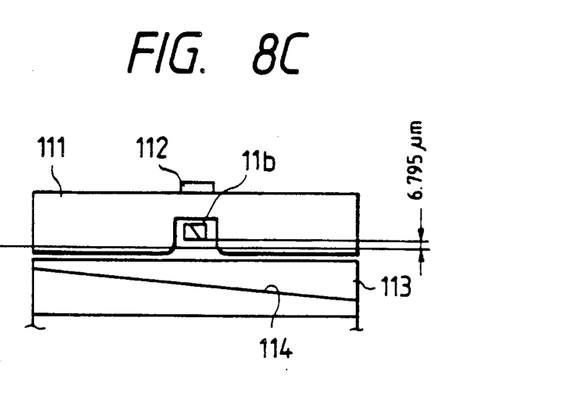

FIGS. 8A through 8C illustrate a first preferred embodiment of the invention, of which FIG. 8A is a top view of a rotary drum 11 with some portions omitted, FIG. 8B is a cross-sectional view taken along a line x in FIG. 8A, and FIG. 8C is a cross-sectional view taken along a line y in 8A. In these figures, reference numeral 11a indicates the head A and reference number 11b the head B. Reference numeral 111 depicts an upper drum which is secured to a rotating shaft 112 of a drum motor (not shown) and rotates in accordance with the rotation of the drum motor. Reference numeral 113 is a stationary lower drum. On the upper drum 111 are provided the heads A and B in a predetermined relation. On the lower drum 113 is provided an inclined lead groove along which a tape is allowed to run.

The rotary drum 11 has a diameter of 15 mm. The head B 11b is mounted one-half track pitch higher than the head A 11a to provide a step difference in height between the two heads. Also, the head B 11b is mounted at an angle 0.465 degrees behind in the rotational direction relative to the position diametrically opposite the head A so that the apparatus can be used at a drum rotational speed of 4000 rpm in the SP mode.

The R-DAT circuit of the aforementioned construction may be the same as that described with reference to FIG. 2, except that circuits for generating various timing signals have minor differences as will be described below.

Figure 9:
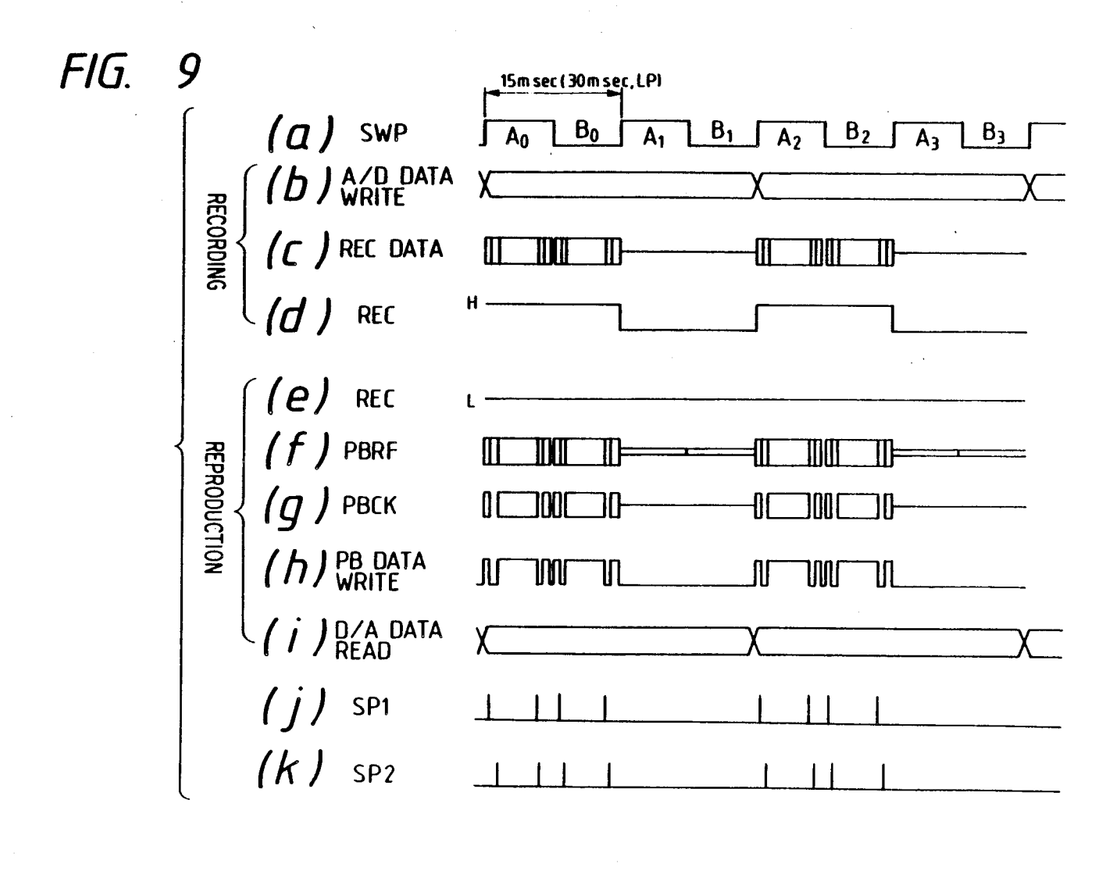

In this embodiment, the switch signal SWP for the head A 11a and the head B 11b has a period of 15 msec, as shown in FIG. 9 at (a), since recording and reproduction of the data are effected at a rotational speed of the rotary drum 11 of 4000 rpm in the SP mode. In this case, for recording, audio data is written into the RAM 65 for 30 msec (time periods $A_0$, $B_0$ and $A_1$, $B_1$); and then recorded on the tape T as REC DATA for the next 15 msec, i.e., during time periods $A_2$ (7.5 msec) and $B_2$ (7.5 msec). In time periods $A_3$ and $B_3$, the REC signal is at "L", as shown in FIG. 9 at (d), even though the heads are in contact with the tape T. On the other hand, for reproduction, the REC signal is at "L", as shown in FIG. 9 at (e), and the PBRF signal is as shown in FIG. 9 at (f).

From this PBRF signal, the PBCK signal is extracted, as shown in FIG. 9 at (g). Using the PBCK signal, a data portion containing only subcodes and PCM data are written as PB DATA into the RAM 65 with the aid of a PB DATA write signal, as shown in FIG. 9 at (h). The data stored in the RAM 65 are read out with the aid of a D/A DATA readout signal, shown in FIG. 9 at (i), and applied to the audio signal unit 2. The sample pulses SP1 and SP2 are generated at timings shown in FIG. 9 at (j) and (h), respectively.

Further, in the LP mode, the rotary drum 11 may be rotated at 2000 rpm for storage and reproduction. The timing chart is the same as that for the SP mode except that one period of the SWP signal is 30 msec. Of course, the tape speed is set to one-half that in the SP mode by the capstan servo circuit 52.

Figure 10:
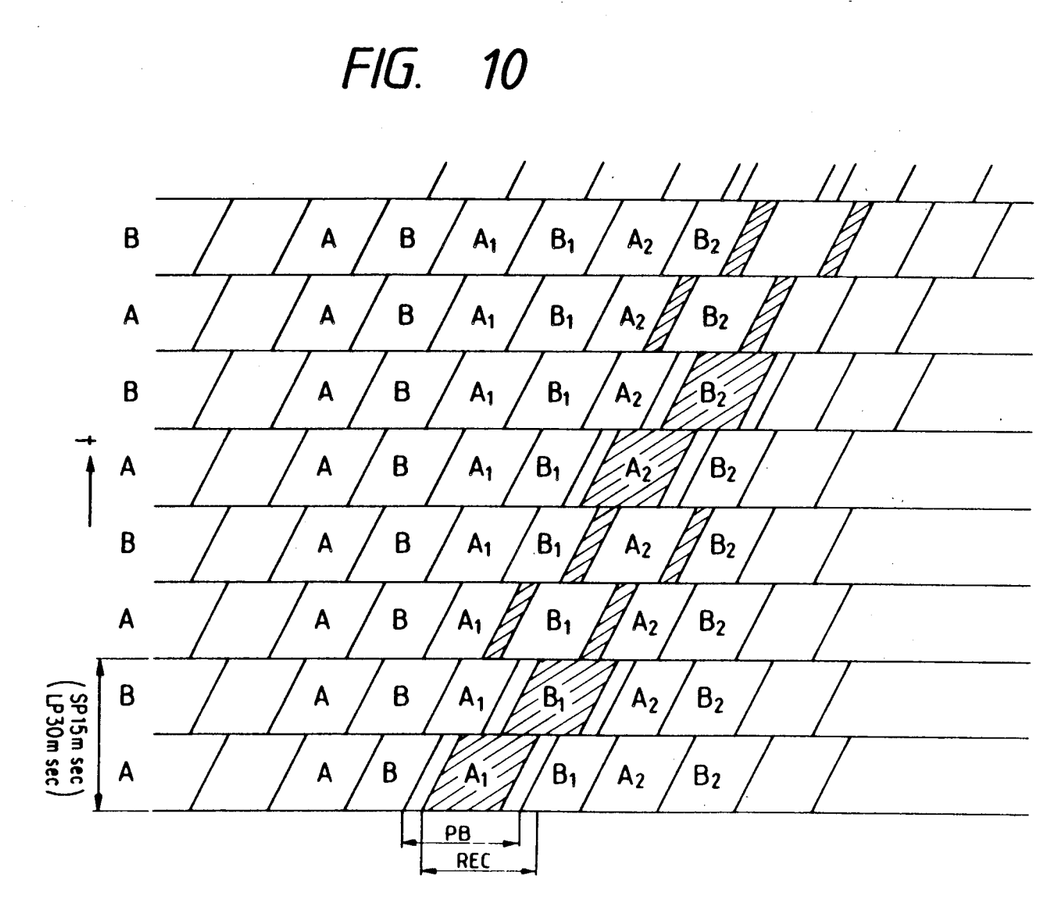
FIG. 10 is a diagram illustrating the relationship between a head and a track when the rotary drum in FIGS. 8A to 8C is used.
Figure 11:
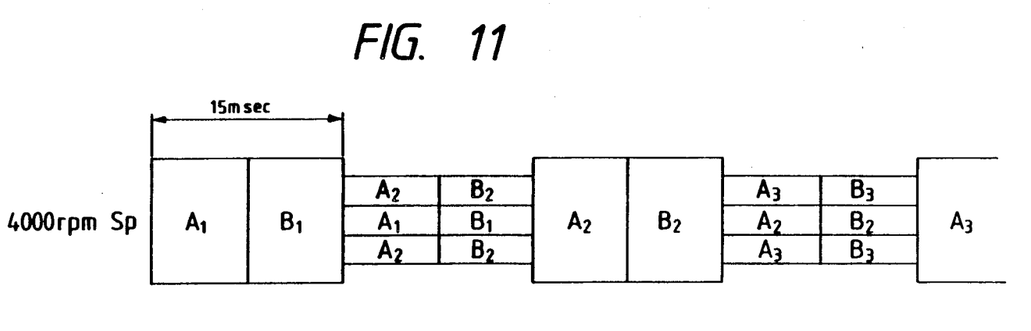
FIG. 11 is a diagram illustrating waveforms of a PBRF signal obtained from the rotary drum in FIGS. 8A to 8C.

In more detail, the head A traces the center of the track $A_1$, and then the following head B arrives at the tape T to trace the center of the track $B_1$, as shown in FIG. 10, when reproducing (PB) data. Thereafter, the head A arrives at the tape T again, but this time the head A passes through the center of the track $B_1$ and the following head B passes through the center of the track $A_2$. Then, when the head A arrives at the tape T again, the head A passes through the middle of the track $A_2$, and thereafter the aforementioned pattern is repeated. Accordingly, the PBRF signal obtained using the rotary drum 11 when reproducing data in the SP mode has waveforms as shown in FIG. 11.

Additionally, REC in FIG. 10 illustrates the head position when storing data, which is a quarter of a head width removed from the position in the PB mode.

Although the rotational speed of the drum when reproducing data in the LP mode is 2000 rpm in the above embodiment, the speed may also be set to 4000 rpm without difficulty and with the same results.

Figure 12:
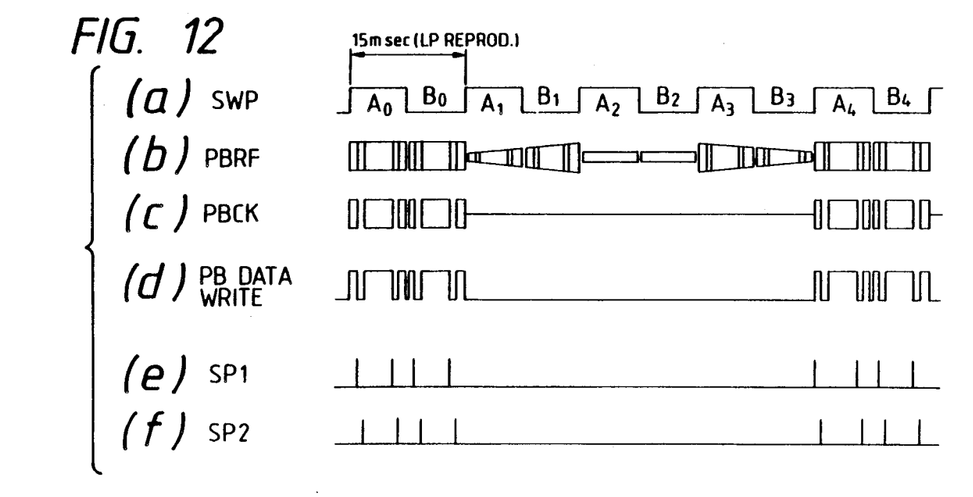

FIG. 12 illustrates waveforms of various signals when the data stored at a rotational speed of the drum of 2000 rpm in the LP mode is reproduced at a rotational speed of 4000 rpm. The SWP signal has a period of 15 msec, as shown in FIG. 12 at (b).

In more detail, if a magnetic tape on which data is stored in the LP mode is to be played back at a rotational speed of 4000 rpm using the aforementioned rotary drum 11, the head A reproduces the track $A_1$ and then the following head B reproduces the track $B_1$.

Thereafter, when the heads A and B arrive at the tape for the fourth time, reproduction of the data is effected in the same way as in the first pass. Thereafter, the same procedure is repeated. The PBRF waveform is shown expanded in FIG. 13.

Figures 13, 14:
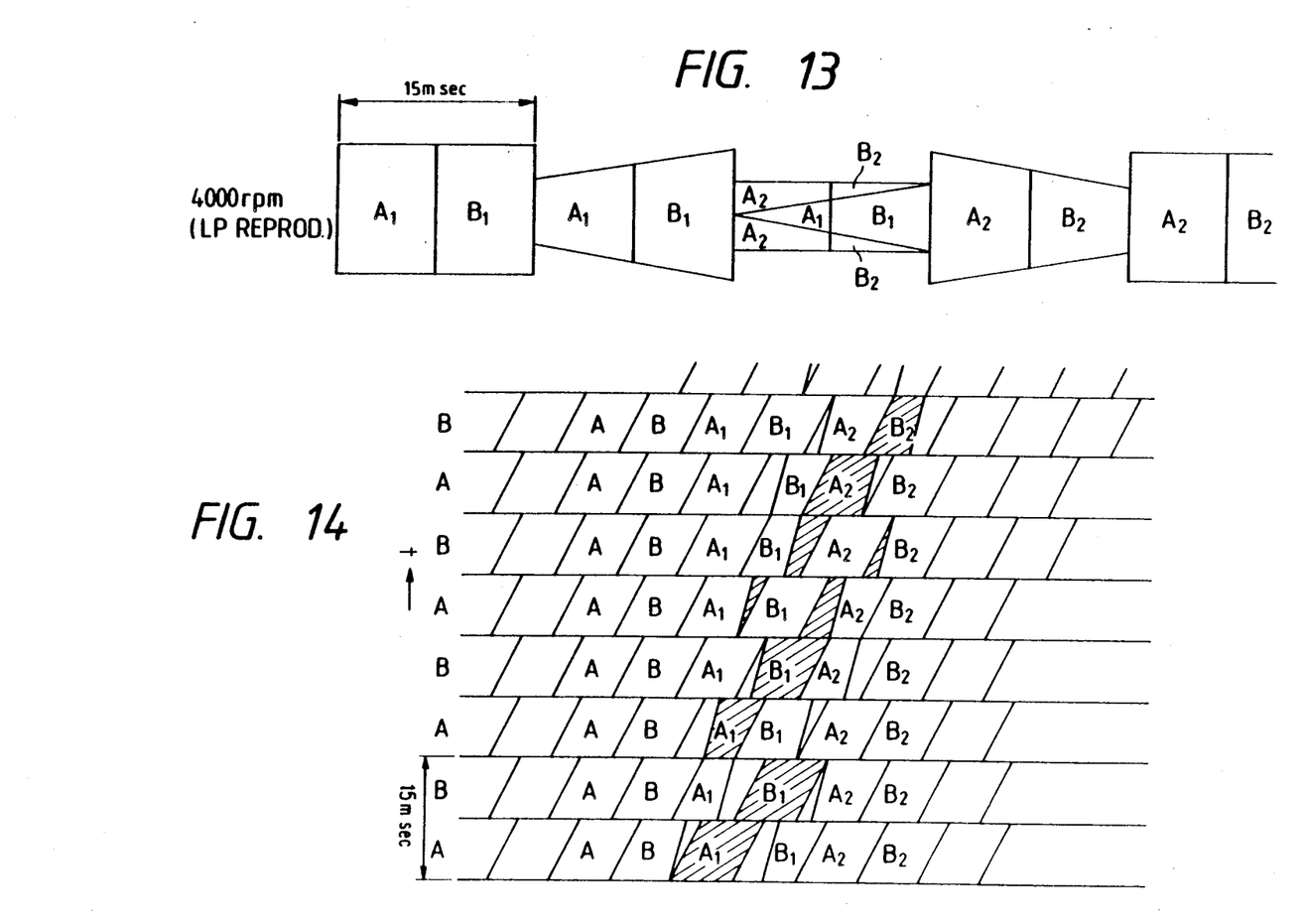
FIG. 13 is a waveform diagram showing in detail the PBRF signal in FIG. 12.
FIG. 14 is a diagram illustrating the relationship between the head and the track of the rotary drum of the embodiment in FIG. 12.

In the embodiment described above, the RF signal is completely reproduced every four rotations of the rotary drum 11, but the tracks on which the data are stored are traced completely, as shown in FIG. 14, without missing any track.

At this time, the PB DATA is not read before time periods $A_4$, $B_4$ after the DATA in time periods $A_0$, $B_0$ have been read, as shown in FIG. 12 at (d). The sampling pulses SP1 and SP2 for tracking are generated at timings shown in FIG. 12 at (e) and (f), respectively.

This embodiment has the effect that the speed of the tape relative to the head in the LP mode can be the same as that in the SP mode, and therefore a large RF signal level can be obtained.

Although the first embodiment has been described by way of example to an R-DAT, the invention may also be applied to, for example, an 8 mm video tape recorder.

As described above, an apparatus for recording and reproducing digital signals according to the present invention is arranged so that the required tape format can be obtained with a simple arrangement, i.e., by only a simple modification of the drum construction, even though the rotational speed of the drum is increased, producing a large relative speed between the tape and the head, a high reproduced signal level, and a reduced error rate.

A further embodiment of the present invention will now be described.

Figure 16:
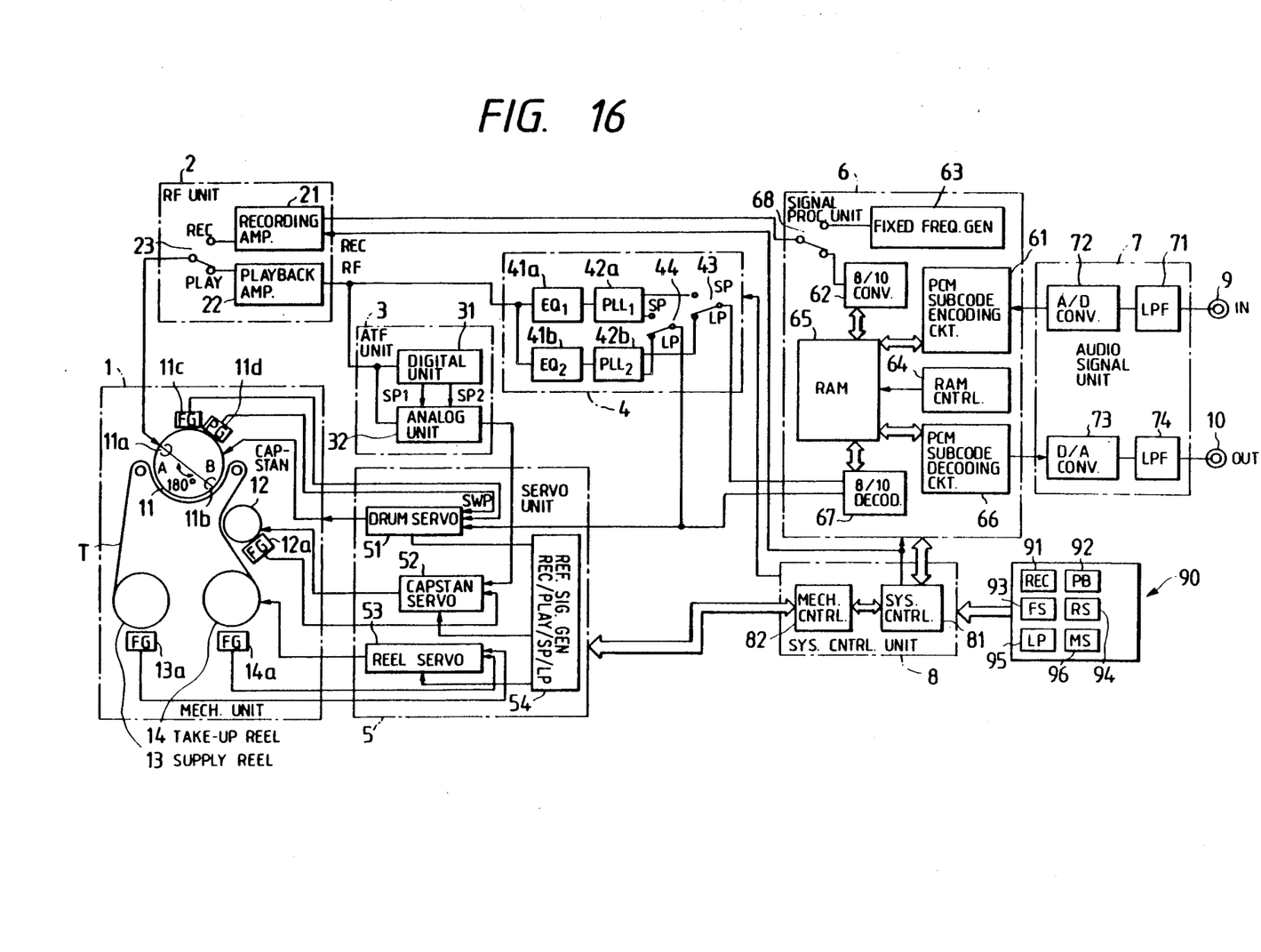
FIG. 16 is a block diagram of the circuit arrangement of an R-DAT of another embodiment according to the invention.

FIG. 16 is a circuit diagram of an R-DAT constructed in accordance with a second embodiment of the invention. In FIG. 16, elements the same as those in the apparatus of FIG. 2 are similarly referenced and hence a further detailed description thereof will be omitted. It is noted that the rotary drum and recording heads as shown in FIGS. 8A to 8C and as described above are employed in this embodiment as well.

In addition to the elements employed in the apparatus of FIG. 2 there is provided an operation unit 90.

An REC button 91 of the operation unit is operated to effect signal storage operations in which unwanted high frequency components in an analog signal applied the analog signal input terminal IN 9 are eliminated by the low pass filter (LPF) 71 in the audio signal unit 7.

In the case where data storage is to be performed in the long play mode (LP) but not in the normal recording mode (SP), an LP pushbutton 95 in the operation unit 90 is operated. In response, control signals indicating that storage is to be effected in the LP mode are supplied from the system controller in the system control unit 8 to the signal processing unit 6, and from the mechanical control unit 82 to the servo unit 5. When reproducing the data, the switches 43 and 44 are shifted to the SP position, that is, opposite to the position shown in FIG. 16. The data that are read by means of the heads 11a and 11b are input to the reproduction amplifier 22 in the RF unit 2 through the switch 23. The output of the reproduction amplifier 22 is supplied to one 41a of two channel equalizer amplifiers in the PLL unit 4 to be equalized and amplified, and is then supplied to a PLL circuit 42a in which period detection is performed to separate the reproduced data (PBDATA) and the reproduced clock (PBCK) from each other.

The PBDATA as well as PBCK are supplied through switches 43 and 44, which are set to the "SP" position, to an 8/10 demodulator 67 in the signal processing unit 6 demodulator.

Normal PBDATA can be obtained if the data read out through the heads 11a and 11b are from a tape on which the data has been stored in the SP mode, while the normal PBDATA cannot be obtained if the data are from a tape on which the data are stored in the LP mode. Thus, when the normal PBDATA cannot be obtained, the system control unit 8 sends to the PLL unit 4 a switching signal for shifting the switches 43 and 44 to the position for the previous channel, that is, to the "LP" position. Thereby, the output from the reproduction amplifier 22 is separated into two signals, PBDATA and PBCK, through the equalizer amplifier 41b and the PLL circuit 42b in the PLL unit 4. The channel frequency of one of the channels is 9.4 MHz and the other is 4.7 MHz.

In this embodiment, the reel servo circuit 53 functions in such a way that the sum of the square of the FG period of the FG 13a for the supply reel 13 and the square of the FG period of the FG 14a for the take-up reel 14 in the mechanical unit 1 is maintained constant during search operations, thereby controlling the speed of tape advancement so as to be constant, i.e., approximately 8.15 mm/sec×200. A system controller 81 in the system control unit 8 controls the reading operations of the operation signal from the operation unit 9, the writing and reading operations of the subcode signal, and also generation of various control signals based on these operations, while the mechanical controller 82 controls the mechanical unit 1 and the servo unit 5, etc. An FS button 93 in the operation unit 90 is employed for effecting a search operation in the FF direction.

When the FS button 93 is operated, the system controller 81 applies to the mechanical unit 1 a control signal which causes the mechanical unit 1 to start the FF search operation. The system controller 81 also applies to the reference signal generator 54 in the search unit 5 a control signal for causing the reference signal generator 54 to generate a signal required for the FF search operation. In response to the signal from the system controller 81, the reference signal generator 54, in accordance with a point X on a solid line in FIG. 15, outputs to the drum servo 51 a reference signal which causes the rotary drum 11 to rotate at approximately 4000 rpm, and also outputs to the reel servo 53 a reference to cause the supply reel 13 and the take-up reel 14 to rotate at a speed such that the tape is advanced at a speed of +(8.15 mm/sec×200). At this time, servo control is not applied to the capstan 12 by the capstan servo 52.

Under the above described conditions, the signals reproduced by the heads 11a and 11b mounted on the rotary drum 11 are supplied to the PLL unit 4 through the sWitch 23 and reproduction amplifier 22. At this time, the switches 43 and 44 are positioned as shown in FIG. 16, and a signal having a channel frequency of 4.7 MHz is reproduced in whichever of the SP and LP mode the magnetic tape currently being played has been recorded. Thus, normal PBDATA can be obtained from the PLL unit 4 for a normal search operation.

An RS button 94 is provided for effecting a search operation in the REW direction. When the RS button 94 is operated, the system controller 81 applies to the mechanical unit 1 a control signal for the mechanical unit 1 to cause it to effect a REW search operation, and also outputs to the reference signal generator 54 a control signal for causing the generator 54 to generate a reference signal necessary for the search operation in the REW direction. In response to these control signals, the reference signal generator 54, in accordance with a point Y on a solid line in FIG. 15, sends to the drum servo circuit 51 a reference signal which causes the rotary drum 11 to rotate at approximately 1000 rpm, and also outputs to the reel servo 53 a reference signal to cause the supply reel 13 and the take-up reel 14 to rotate at a rotational speed such that the tape is advanced at a speed of $-(8.15 \text{ mm/sec} \times 100)$.

Under this condition, in whichever of the SP and LP mode the magnetic tape currently being played back has been recorded, a signal of 4.7 MHz can be obtained for a normal search operation, as in the search operation in FF direction.

An MS button 96 is provided for specifying a program number that has been recorded on the tape to be played back and then for selecting a tune through high speed search. When the MS button is operated, the system control unit 8 compares the specified program number and the current program number and then determines the direction of search on the basis of this comparison. Then, the system control unit 8 performs a search operation in a manner similar to that when the FS button 93 and RS button 94 are operated. Playback is initiated from the introduction of the tune specified on the basis of the information as to the program number and the S-ID which are obtained through this search operation. Although an apparatus having both reproducing and recording functions has been shown as an example, the present invention can also be applied effectively to an apparatus having no recording function but only a reproducing function.

According to this embodiment of the present invention, the upper limit of the drum rotational speed can be reduced, thereby allowing a narrow control range of rotational speed of the rotary drum. The narrow control range of rotational speed permits good characteristics in servo controlling the drum speed with a narrow range of control voltage, which is particularly effective in an apparatus operating on a battery type power source.

The arrangement thus far described permits signal processing of the reproduced signals at relative speeds corresponding to, for example, 4000 rpm and 2000 rpm. The functions of the search operation are set so that the relative speed in a searching operation in the FF direction is equal to that during a search operation in which the rotary drum rotates at a speed of 2000 rpm and so that the relative speed in a searching operation in the FF direction is equal to that for a reproducing operation in which the rotary drum rotates at a rotational speed of 4000 rpm. Thus, the rotational speed of the rotary drum during high speed searching not only can be set lower than that in a conventional apparatus, but also it is only required that this speed be varied within only a very narrow range.

In a signal reproducing operation in which the PB button 92 in the operation unit 9 is operated, the switches 43 and 44 are shifted to REW (SP) (as shown in FIG. 16) upon receiving a signal from a system control unit 8. As described above, the data which are read through the heads 11a and 11b are input through the switch 23 to the reproduction amplifier 22 in the RF unit 2. The output of the reproduction amplifier 22 is supplied to one 41a of the channel equalizer amplifiers to be equalized and amplified, and is then supplied to the PLL circuit 42a in which period detection is performed to separate the reproduced data (PBDATA) and the reproduced clock (PBCK) from each other. The PBDATA and PBCK are supplied through switches 43 and 44 to the 8/10 demodulator 67 in the signal processing unit 6 for demodulation. The output of the demodulator is input to the RAM 65 sequentially under the control of the RAM control unit 64 to be stored therein. Also as already described, the PCM subcode decoding circuit 66 performs error-correction and deinterleaving of the data stored in the RAM 65. The output of the circuit 66 is supplied to the D/A converter 73 in the audio signal unit 7 to be converted into an analog signal, and is then applied to the LPF 74 where the unwanted high frequency components are eliminated. The resulting signal is sent out upon the analog signal output terminal "OUT".

The aforementioned signal processing unit 6 is provided with a fixed frequency signal such as STF. The fixed frequency signals generated by the generator 63 are insertion-recorded onto the magnetic tape through the switch 68, which is shifted at a predetermined timing.

This embodiment will now be described in more detail with reference to the timing charts illustrated in FIGS. 17 to 19. First, in the case of initiating a reproducing operation in which operating the FS button 93 or the MS button 96 activates an FF search operation to detect the required S-ID, when the mechanical unit 1 performs a search operation as shown in FIG. 17 at (c), the drum speed is set to approximately 4000 rpm, as shown in FIG. 17 at (d), and the channel frequency of the PLL 4 is 4.7 MHz, as shown in FIG. 17 at (e).

Then, when the S-ID is detected, the tape speed is gradually reduced to zero while the operation of the mechanical unit 1 is stopped. At this time, the channel frequency is switched to 9.4 MHz. Thereafter, the drum rotational speed is set to 4000 rpm, then the mechanical unit 1 is set to the review state (REView) to compensate for any overrun, in which the tape speed is $-3$ times higher. S-ID detection is again effected to set the mechanical unit 1 to the reproducing state (PLAY). In other words, the tape is made to run at a constant speed with the aid of the capstan 12.

Figure 17:
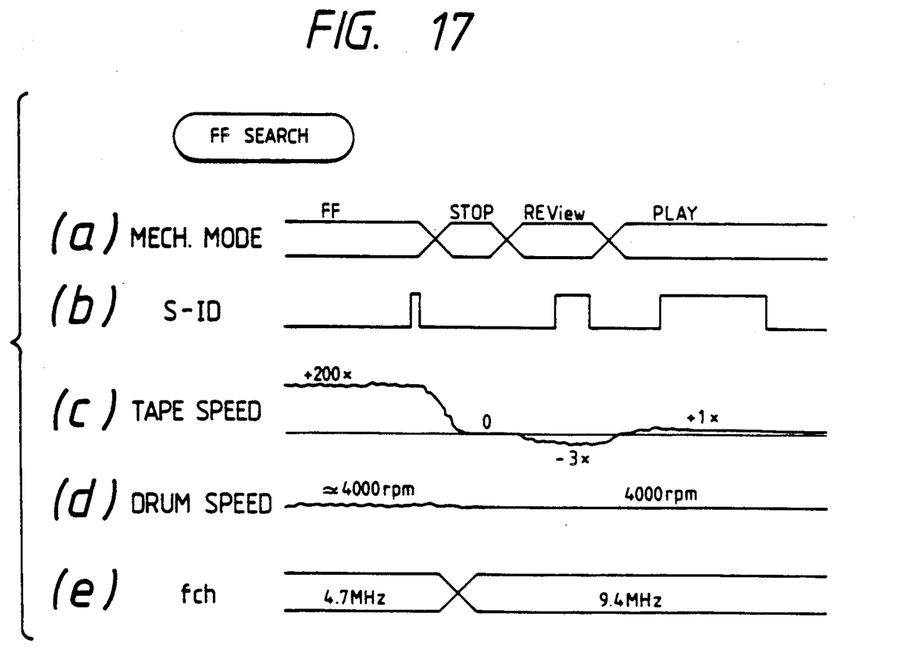

As apparent from FIG. 17, the drum rotational speed in the search operation is maintained at approximately 4000 rpm. Thus, the drum servo is not required to be pulled in quickly during searching.

Figure 18:
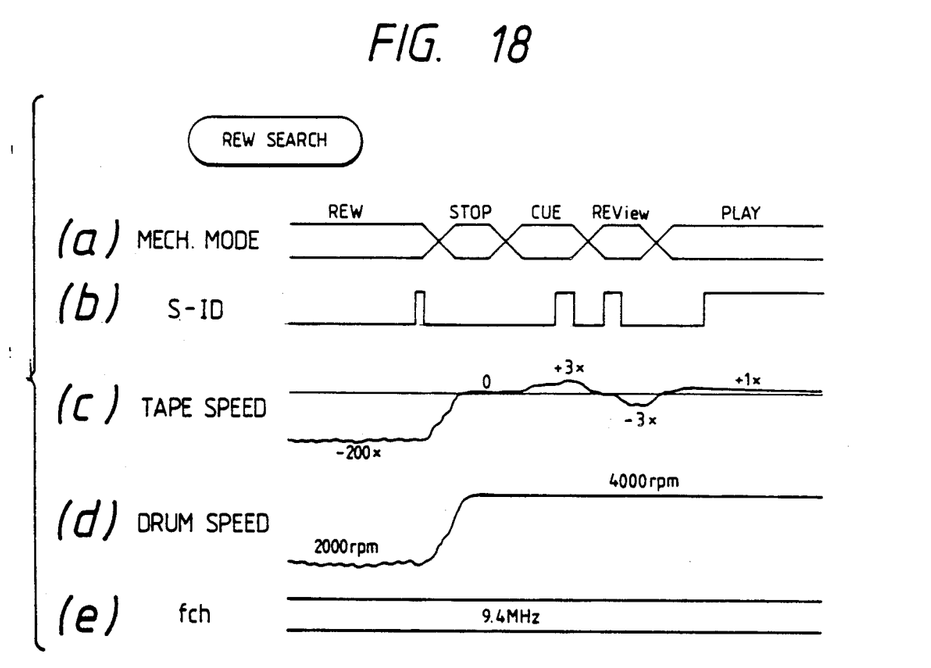

In the case of initiating a reproducing operation in which operating the RS button 94 or the MS button 96 initiates a REW search operation to detect the required S-ID, when the mechanical unit 1 performs a REW search operation as shown in FIG. 18 at (a), the tape speed is set to $-200$ times higher, the drum rotational speed is set to 2000 rpm, and the channel frequency is 9.4 MHz.

Then, when the S-ID is detected, the tape speed is set to zero and the rotational speed of the drum is set to 4000 rpm to stop the operation of the mechanical unit 1. Subsequently, the tape speed and the drum speed are gradually changed to 0 and 4000 rpm, respectively. Thereafter, the mechanical unit 1 is set to the cue (CUE) state and the tape speed is set $+3$ times higher in order to effect detection of the S-ID again. After the redetection of the S-ID, a review operation (REView) is performed, and reproducing is started as soon as the S-ID is detected through the review operation. As apparent from FIG. 18, the difference between the aforementioned two cases is relatively small except that the drum rotational speed is 2000 rpm in one case and 4000 rpm in the other case.

Figure 19:
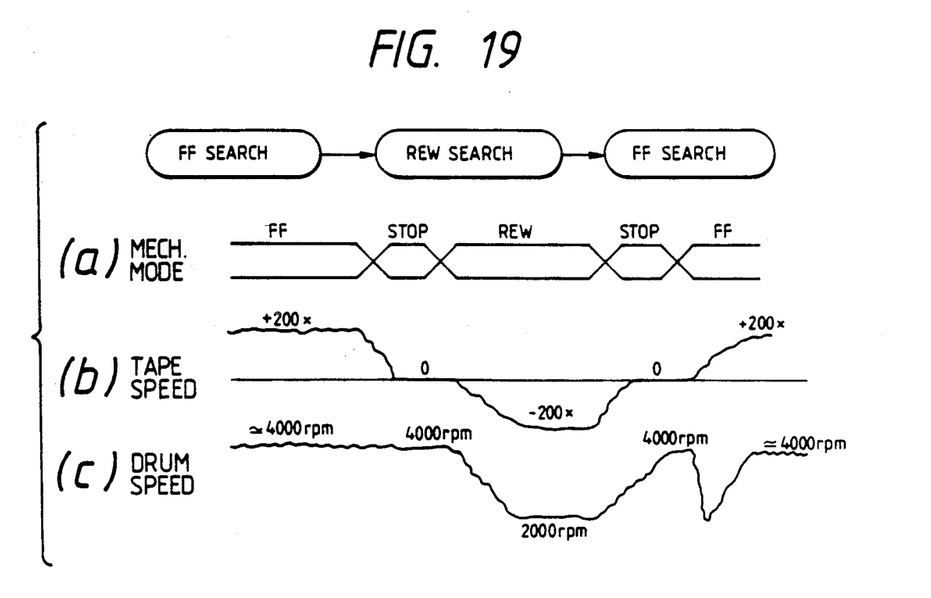

Finally, as illustrated in FIG. 19, when the search operation is to be performed in the order of FF search-→REW search→operation search, the operations described with reference to FIGS. 17 and 18 are merely repeated while the drum speed is switched to either 4000 rpm or 2000 rpm.

In the embodiment described, the drum rotates selectively at a rotational speed of 4000 rpm or 2000 rpm, but the present invention can effectively be applied to an apparatus in which the drum rotates selectively at a rotational speed of 2000 rpm or 1000 rpm.

According to the above embodiment, the rotational speed of the rotary drum in a high speed search operation is not only maintained at a low value but also the speed need be varied only in a narrow range. Thus, a low voltage for controlling the rotational speed of the drum permits good characteristics in servo-controlling the drum speed, which is particularly effective in an apparatus operating on a battery-type power source.

Further, the drum servo can be pulled in quickly during the search operation, thereby enabling rapid switching of operations.

What is claimed is:

1. A method for performing a reproduction operation in which information recorded on a tape is reproduced, and for performing a search operation in which an identification signal recorded on the tape is searched, the method being performed on a data recording and reproducing device of the helical scan type which includes a pair of recording and reproducing heads mounted on a rotary drum, the method comprising the steps of:

(a) during the reproduction operation, transporting the tape and rotating said rotary drum such that a relative speed between said tape and said heads is one of a first relative speed and a second relative speed which is less than the first relative speed; and (b) during the search operation, transporting the tape at a speed substantially greater than a tape speed used during the reproduction operation and rotating said rotary drum at a speed such that a relative speed between said tape and said heads is equal to said second relative speed, said second relative speed being used during the search operation regardless of whether said first or said second relative speed is used during the reproduction operation.

2. The method as defined in claim 1, wherein during said search operation, said tape is transported in one of a first and a second direction of transport, said rotary drum is rotated at a first rotational speed when said tape is transported in the first direction of transport and is rotated at a second rotational speed, which is different from said first rotational speed, when said tape is transported in the second direction of transport.

3. The method as defined in claim 2, wherein said device includes a phased-locked loop, and wherein during the search operation, said tape is transported at a speed which is approximately 200 times the tape speed used during the reproduction operation, said rotary drum is rotated at approximately 4000 rpm without servo control, and a channel frequency of the phase-locked loop for reproducing information recorded on said tape and received from said heads is set to approximately 4.7 MHz.

4. The method as defined in claim 3, wherein during the search operation and upon detection of said recorded identification signal, said tape speed is gradually reduced to zero, said channel frequency is switched to approximately 9.4 MHz, and a rotational speed of said rotary drum is set to approximately 4000 rpm with servo control, and wherein the method further comprises the steps of: transporting, when the tape speed is reduced to zero, the tape at a speed which is approximately −3 times the speed normally used during the reproduction operation, detecting said identification signal for a second time, and upon detection of the identification signal for the second time, transporting the tape at the tape speed used during reproduction.

5. The method as defined in claim 2, wherein said recording device includes a phase-locked loop, and wherein during the search operation, said tape is transported at a tape speed which is approximately −200 times a tape speed normally used during the reproduction operation, said rotary drum rotates at approximately 2000 rpm without servo control, and a channel frequency of said phase-locked loop for reproducing recorded information from said heads is set to approximately 9.4 MHz.

6. The method as defined in claim 5, further comprising the steps of: upon detection of said recorded identification signal during the search operation, gradually reducing the tape speed to zero, and setting said rotational speed of said rotary drum to 4000 rpm with servo control, transporting, after the tape speed is reduced to zero, said tape at a tape speed which is 3 times the tape speed normally used for recording and reproducing, detecting said identification signal for a second time, and transporting, upon detection of the identification signal for the second time, said tape at a tape speed which is normally used during the reproduction operation.

* * * * *